United States Patent
Zhang et al.

(10) Patent No.: US 10,326,972 B2
(45) Date of Patent: Jun. 18, 2019

(54) THREE-DIMENSIONAL IMAGE GENERATION METHOD AND APPARATUS

(71) Applicant: Samsung Electronics Co., Ltd., Suwon-si (KR)

(72) Inventors: Yongjie Zhang, Beijing (CN); Hui Zhang, Beijing (CN); Fei Duan, Beijing (CN); Haoxing Wang, Beijing (CN); Jae-Joon Han, Seoul (KR); Jung-Bae Kim, Seoul (KR); Seonmin Rhee, Seoul (KR); Gengyu Ma, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 14/977,282

(22) Filed: Dec. 21, 2015

(65) Prior Publication Data

US 2016/0191903 A1    Jun. 30, 2016

(30) Foreign Application Priority Data

Dec. 31, 2014  (CN) .......................... 2014 1 0854192
Sep. 30, 2015  (KR) ........................ 10-2015-0137713

(51) Int. Cl.
*H04N 13/02*  (2006.01)
*G06T 7/55*  (2017.01)
*H04N 13/261*  (2018.01)
*H04N 13/00*  (2018.01)

(52) U.S. Cl.
CPC ............ *H04N 13/026* (2013.01); *G06T 7/55* (2017.01); *H04N 13/261* (2018.05); *G06T 2207/30201* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 6,047,078 | A | 4/2000 | Kang |
| 6,016,148 | A | 6/2000 | Kang et al. |
| 6,556,196 | B1 | 4/2003 | Blanz et al. |
| 7,095,879 | B2 | 8/2006 | Yan et al. |
| 7,218,760 | B2 | 5/2007 | Gu et al. |

(Continued)

FOREIGN PATENT DOCUMENTS

| | | |
|---|---|---|
| EP | 2 672 424 A1 | 12/2013 |
| JP | 2004-506276 A | 2/2004 |

(Continued)

OTHER PUBLICATIONS

WO 2000/034803 ; Nov. 19, 1999; Chen et al english translation.*

(Continued)

*Primary Examiner* — Nancy Bitar
(74) *Attorney, Agent, or Firm* — NSIP Law

(57) ABSTRACT

A method and apparatus of generating a three-dimensional (3D) image are provided. The method of generating a 3D image involves acquiring a plurality of images of a 3D object with a camera, calculating pose information of the plurality of images based on pose data for each of the plurality of images measured by an inertial measurement unit, and generating a 3D image corresponding to the 3D object based on the pose information.

20 Claims, 19 Drawing Sheets

(56) References Cited

U.S. PATENT DOCUMENTS

| | | | | |
|---|---|---|---|---|
| 7,755,619 | B2* | 7/2010 | Wang | G06T 17/20 345/419 |
| 7,835,568 | B2 | 11/2010 | Park et al. | |
| 9,563,958 | B1* | 2/2017 | Choi | H04N 13/0214 |
| 9,786,080 | B1* | 10/2017 | Choi | G06T 11/60 |
| 9,984,301 | B2* | 5/2018 | Dos Santos Mendonca | G06K 9/46 |
| 10,116,874 | B2* | 10/2018 | Case, Jr. | H04N 5/23216 |
| 2004/0240708 | A1* | 12/2004 | Hu | G06F 3/012 382/103 |
| 2008/0309662 | A1 | 12/2008 | Hassner et al. | |
| 2009/0262113 | A1* | 10/2009 | Kotake | G02B 27/017 345/427 |
| 2010/0134487 | A1 | 6/2010 | Lai et al. | |
| 2011/0148864 | A1 | 6/2011 | Lee et al. | |
| 2014/0043329 | A1 | 2/2014 | Wang et al. | |
| 2014/0064579 | A1 | 3/2014 | Lee et al. | |
| 2014/0233849 | A1 | 8/2014 | Weng et al. | |
| 2015/0070352 | A1* | 3/2015 | Jones | G06T 7/0044 345/420 |
| 2015/0131859 | A1* | 5/2015 | Kim | G06K 9/00268 382/103 |

FOREIGN PATENT DOCUMENTS

| | | |
|---|---|---|
| JP | 2005-78646 A | 3/2005 |
| KR | 10-2008-0111325 A | 12/2008 |
| KR | 10-2011-0070056 A | 6/2011 |
| KR | 10-2014-0028415 A | 3/2014 |
| WO | WO 2014/003507 A1 | 1/2014 |

OTHER PUBLICATIONS

Newcombe, Richard A., et al. "KinectFusion: Real-time dense surface mapping and tracking ." 10th IEEE international symposium on. IEEE, 2011 (10 pages).

Izadi, Shahram, et al. "KinectFusion: real-time 3D reconstruction and interaction using a moving depth camera." Proceedings of the 24th annual ACM symposium on User interface software and technology. ACM, 2011 (10 pages).

Pradeep, Vivek, et al. "MonoFusion: Real-time 3D reconstruction of small scenes with a single web camera." IEEE International Symposium on. IEEE, 2013 (6 pages).

Tanskanen, Petri, et al. "Live metric 3d reconstruction on mobile phones." IEEE International Conference on. IEEE, 2013 (8 pages).

Cao, Chen, et al. "3D shape regression for real-time facial animation." ACM Transactions on Graphics (TOG) 32.4, 2013: Article 41 (10 pages).

Garg, Ravi, et al. "Dense variational reconstruction of non-rigid surfaces from monocular video." Computer Vision and Pattern Recognition (CVPR), 2013 IEEE Conference on. IEEE, 2013 (8 pages).

Kemelmacher-Shlizerman, Ira. "Internet based morphable model." Computer Vision (ICCV), 2013 IEEE International Conference on. IEEE, 2013 (8 pages).

Suwajanakorn, Supasorn, et al. "Total moving face reconstruction." Computer Vision—ECCV 2014. Springer International Publishing, 2014 (17 pages).

Kolev, Kalin, et al. "Turning mobile phones into 3D scanners." Computer Vision and Pattern Recognition (CVPR), 2014 IEEE Conference on. IEEE, 2014 (8 pages).

\* cited by examiner

THREE-DIMENSIONAL IMAGE GENERATION METHOD AND APPARATUS

CROSS-REFERENCE TO RELATED APPLICATION(S)

This application claims the benefit under 35 USC 119(a) of Chinese Patent Application No. 201410854192.2, filed on Dec. 31, 2014, in the State Intellectual Property Office of the People's Republic of China and Korean Patent Application No. 10-2015-0137713 filed on Sep. 30, 2015, in the Korean Intellectual Property Office, the entire disclosures of both of which are incorporated herein by reference for all purposes.

BACKGROUND

1. Field

The following description relates to a three-dimensional (3D) image generation method and apparatus, and to a method and apparatus for generating a 3D image using two-dimensional (2D) images.

2. Description of Related Art

A general method of converting two-dimensional (2D) images to a three-dimensional (3D) image may be performed by exclusive software. In general, 2D images may not include depth information used in a 3D image generation. Thus, it is difficult to generate an actual 3D shape based on such method when 2D images of a user face are converted to a 3D image. Also, in terms of the method, a shape represented by a 3D image may differ based on an arbitrary expression ability of a technician.

SUMMARY

This Summary is provided to introduce a selection of concepts in a simplified form that are further described below in the Detailed Description. This Summary is not intended to identify key features or essential features of the claimed subject matter, nor is it intended be used as an aid in determining the scope of the claimed subject matter.

In one general aspect, a method of generating a three-dimensional (3D) image involves acquiring a plurality of images of a 3D object with a camera, calculating pose information of the plurality of images based on pose data for each of the plurality of images measured by an inertial measurement unit (IMU), and generating a 3D image corresponding to the 3D object based on the pose information.

The calculating may involve classifying the plurality of images into at least one image segment, calculating first pose information of images in each image segment based on pose data for each of the images, and calculating the pose information of the plurality of images based on the first pose information.

The calculating of the first pose information involves calculating a first pose parameter comprising at least one of rotation angle information and parallel transference direction information of neighboring images in each image segment, based on the pose data for each of the images, calculating a second pose parameter by merging neighboring first pose parameters, wherein the neighboring first pose parameters correspond to a single common image, and the second pose parameter comprises parallel transference scale information; and calculating the first pose information based on the first pose parameter and the second pose parameter.

The calculating of the first pose parameter may involve calculating pose estimation result information of the neighboring images based on short distance feature correspondence information, the pose estimation result information comprising the first pose parameter and short distance feature correspondence information, the short distance feature correspondence information comprising a feature correspondence initial image and feature correspondence information of images neighboring the feature correspondence initial image in a first image segment comprising the feature correspondence initial image, and wherein the calculating of the second pose parameter comprises merging the neighboring first pose parameters based on long distance feature correspondence information and the pose estimation result information, the long distance feature correspondence information comprising feature correspondence information of images in the first image segment other than the feature correspondence initial image.

The calculating of the pose estimation result information may involve acquiring the short distance feature correspondence information, selecting the short distance feature correspondence information, and calculating the pose estimation result information based on the selected short range feature correspondence information.

The merging of the neighboring first pose parameters may involve acquiring the long distance feature correspondence information, calculating first 3D point information of the neighboring first pose parameters based on the long distance feature correspondence information, determining 3D point information acquired through the pose estimation result information to be second 3D point information, and merging the neighboring pose parameters based on the first 3D point information and the second 3D point information.

The calculating of the pose information of the plurality of images may further involve calculating a third pose parameter of the plurality of images by merging neighboring first pose parameters included in differing image segments, wherein the neighboring first parameters included in the differing image segments correspond to an image shared by the differing image segments, and the third pose parameter comprises parallel transference scale information; and calculating the pose information of the plurality of images based on the first pose information and the third pose parameter.

The calculating of the pose information of the plurality of images may further involve calculating a third pose parameter of the plurality of images by merging neighboring first pose parameters included in differing image segments, wherein the neighboring first pose parameters included in the differing image segments correspond to an image shared by the differing image segments, and the third pose parameter comprises parallel transference scale information; and calculating the pose information of the plurality of images based on the first pose information and the third pose parameter, and wherein the calculating of the third pose parameter comprises: determining third 3D point information and fourth 3D point information, each corresponding to the neighboring first pose parameters included in the differing image segments among the second 3D point information indicating the 3D point information acquired through the pose estimation result information; and calculating a third pose parameter of the plurality of images by merging the neighboring first pose parameters included in the differing image segments based on the third 3D point information and the fourth 3D point information.

The generating may involve refining the pose information; and generating the 3D image based on the refined pose information.

The generating involves generating surface model information of the object based on the pose information, and generating the 3D image based on the surface model information.

The generating of the surface model information may involve performing a stereo matching based on the pose information, acquiring depth image information of the object based on a result of the stereo matching, and generating the surface model information based on the depth image information.

The generating of the surface model information may involve generating first surface model information of the object based on the pose information; and generating the surface model information by refining the first surface model information.

The generating of the surface model information by refining the first surface model information may involve refining the first surface model information based on template model information of the object.

The refining of the first surface model information based on the template model information may involve at least one of: removing information not corresponding to the template model information from the first surface model information; removing a first value of the first surface model information in response to a difference between the first value and a second value of the template model information corresponding to the first value being greater than a preset threshold; and adding information to the first surface model information.

The acquiring of the plurality of images may involve acquiring the plurality of images by extracting images from a plurality of initial images of the 3D object based on a preset image extraction method.

The preset image extraction method may involve at least one of a method of extracting an image based on a quality of the image, a method of extracting an image based on pose data of the image, and a method of extracting an image based on a photographing time of the image.

The acquiring of the plurality of images by extracting the images may involve: setting the extracted images as candidate images, determining a front image corresponding to a front side of the object among the candidate images, determining an image having a preset rotation angle relative to the front image to be a side image among the candidate images, and acquiring the plurality of images based on the front image and the side image.

The acquiring of the plurality of images may involve classifying the plurality of images into at least one image segment. The neighboring image segments may share at least one image.

The object may be a face.

In another general aspect, a terminal includes a camera configured to acquire a plurality of images of a three-dimensional (3D) object, and a processor configured to calculate pose information of the plurality of images based on pose data for each of the plurality of images measured by an inertial measurement unit (IMU) and generate a 3D image corresponding to the 3D object based on the pose information.

The plurality of images may include two-dimensional (2D) images of the 3D object.

In another general aspect, a method of generating a three-dimensional (3D) image involves acquiring a plurality of images of a 3D object with an electronic device, and generating a 3D image corresponding to the 3D object by obtaining information regarding a movement of the electronic device via a sensor included in the electronic device to calculate pose information of the plurality of images.

The electronic device may be a terminal comprising a camera, and the sensor may be an inertial measurement unit of the terminal.

The generating of the 3D image may involve determining an image among the plurality of images that most closely correspond to a front image of the 3D object based on symmetry.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
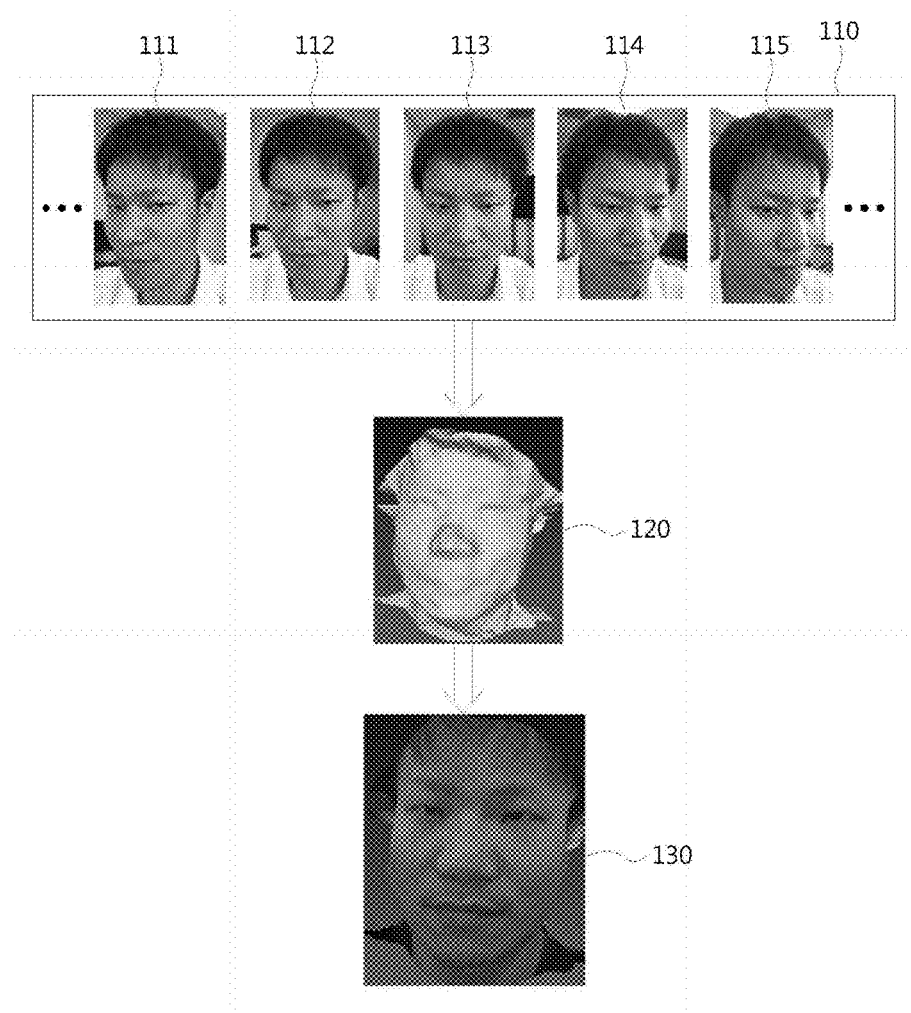
FIG. 1 illustrates an example of a method of generating a three-dimensional (3D) image based on two-dimensional (2D) images.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 illustrates an example of a method of generating a three-dimensional (3D) image based on two-dimensional (2D) images.

The 2D image may be, for example, a digital image including a plurality of pixels. Alternately, the image may refer to a frame.

According to one example, 2D images acquired by photographing an object may be used to generate a 3D image. The 3D image may be generated based on 2D images acquired by photographing the object from a plurality of viewpoints.

A correlation between 2D images may be calculated by analyzing and comparing features of the 2D images. A 3D model of the object may be generated based on the calculated correlation.

In the example illustrated in FIG. 1, the object is a head of an individual that includes a face.

The 2D images may be obtained by, for example, a user photographing a face of a person from a plurality of viewpoints. The user may use a camera included in a portable terminal to photograph the face. A camera refers to a hardware device that takes pictures or video. In the illustrated example, the 2D images 111 through 115 of the object is generated by a portable terminal.

In this example, a processor of the portable terminal calculates a feature correspondence relationship of the 2D images 111 through 115. The portable terminal may generate a surface 120 of the object based on the feature correspondence relationship.

In this example, the portable terminal generates a 3D image 130 of the object based on the surface 120. For example, the portable terminal performs texturing on the surface 120.

Although the portable terminal is used to generate the 2D image in the aforementioned example, the present disclosure is not limited thereto.

In an example, the 3D image 130 is generated by additionally using pose data of the portable terminal acquiring the 2D images 111 through 115. The pose data is measured by, for example, an inertial measurement unit (IMU) and an inertial sensor included in the portable terminal.

The 3D image 130 includes information regarding the 3D coordinates of facial surface of a user, which has a variety of applicability. For example, the 3D image 130 may be displayed back to the user, using a display of the portable terminal so that the face is rendered from a different view point. In one example, the processor of the portable terminal may construct a virtual representation of the user with different facial expression. The virtual representation can be applied to a computer game, and displayed back to the user via the portable terminal or displayed in a portable terminal of a friend of the user. Various other ways of applying the 3D image to a portable terminal, an electronic device, game console, and the like are possible.

Descriptions related to a method of generating the 3D image based on the pose data will be described with reference to FIGS. 2 through 10.

Figure 2:
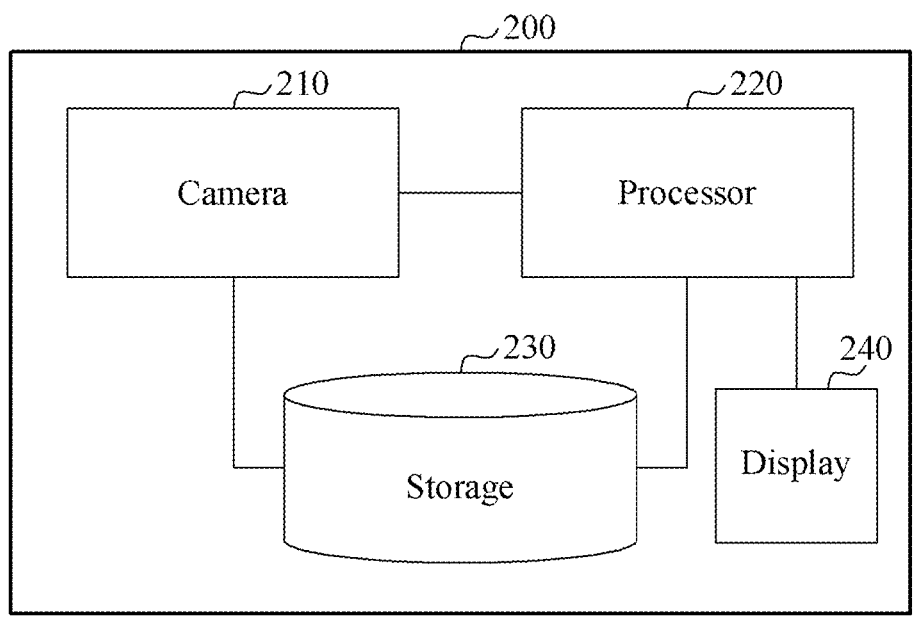
FIG. 2 is a block diagram illustrating an example of a 3D image generation apparatus.

FIG. 2 is a block diagram illustrating a 3D image generation apparatus 200.

The 3D image generation apparatus 200 may be a terminal. The 3D image generation apparatus 200 may be, for example, a portable terminal, a personal computer (PC), and a laptop computer. However, the 3D image generation apparatus 200 is not limited to these examples; other apparatus that is configured to process a photographed image may serve as the 3D image generation apparatus 200.

The 3D image generation apparatus 200 includes a camera 210, a processor 220, a storage 230, and a display 240. Hereinafter, the 3D image generation apparatus 200 is also referred to as an apparatus 200.

In this example, the camera 210 generates a digital image by photographing an actual object.

The processor 220 is, for example, a hardware processor included in the apparatus 200. The processor 220 controls the camera 210 and the storage 230. The processor 220 processes an image generated by the camera 210 and processes data in the storage 230.

The processor 220 controls the camera 210 to process the image.

The storage 230 stores the image generated by the camera 210 and stores the data processed by the processor 220.

The display 240 displays the image taken by the camera 210, the surface 120 of the object generated by the 3D image generation apparatus 200, the 3D image 130 generated by the 3D image generation apparatus 200, and the like. The display described herein may be implemented using a liquid crystal display (LCD), a light-emitting diode (LED) display, a plasma display panel (PDP), a screen, a touch screen or any other type of display known to one of ordinary skill in the art. A screen refers to a physical structure that includes one or more hardware components that provide the ability to render an image or a user interface. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display.

Descriptions related to the camera 210, the processor 220, and the storage 230 will be provided further with reference to FIGS. 3 through 19.

Figure 3:
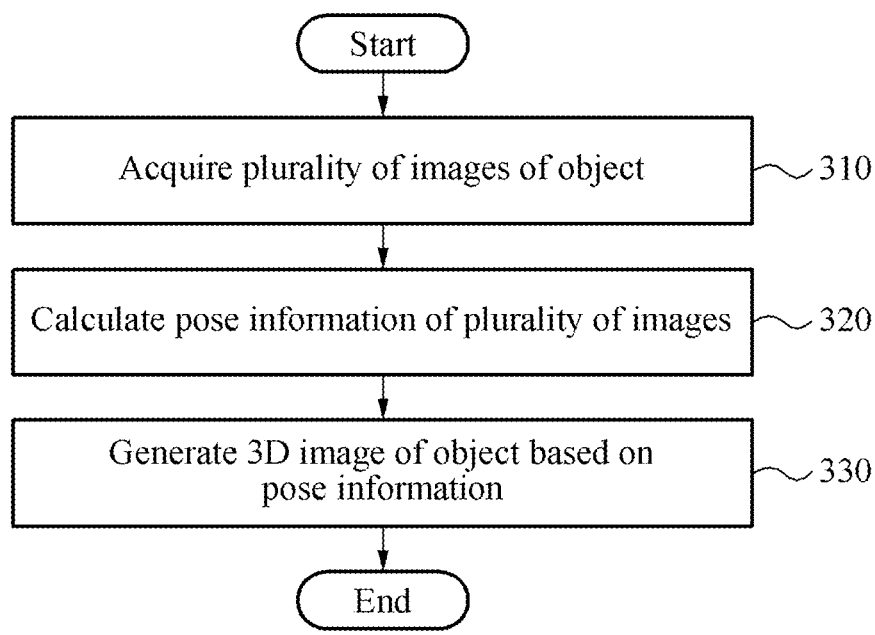
FIG. 3 is a flowchart illustrating an example of a 3D image generation method.

FIG. 3 illustrates an example of a 3D image generation method.

In operation 310, a camera 210 acquires a plurality of images of an object by photographing the object.

Figure 4:
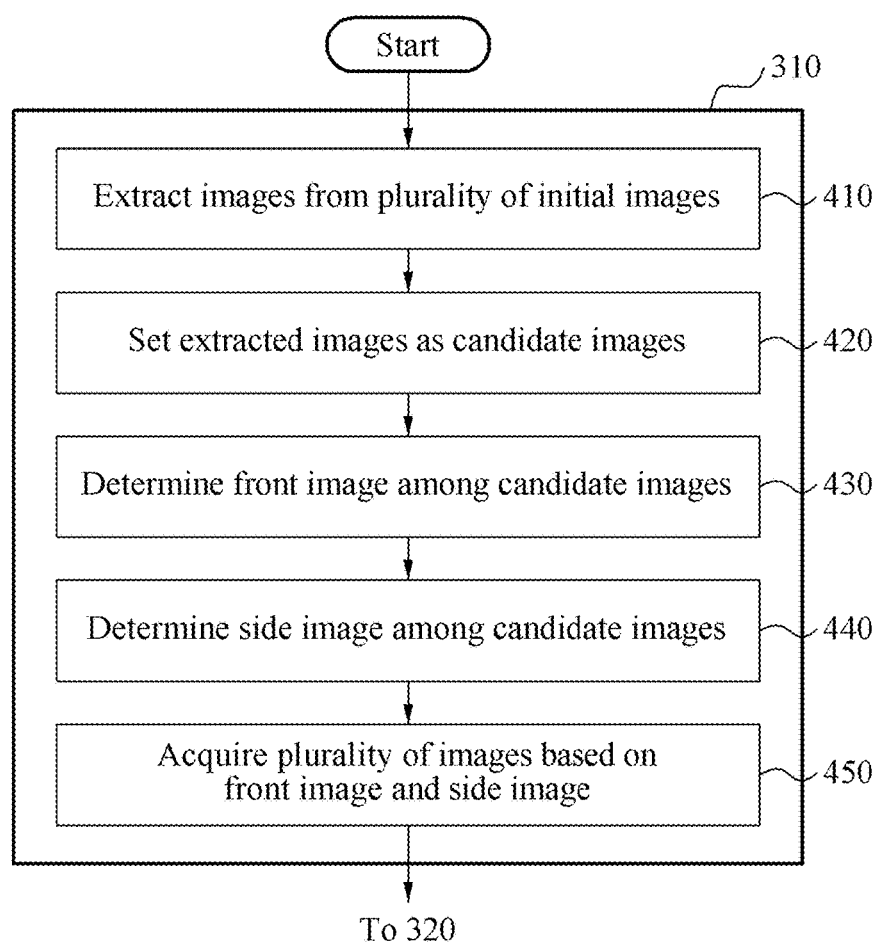
FIG. 4 is a flowchart illustrating an example of a method of acquiring a plurality of images of an object.
Figure 5:
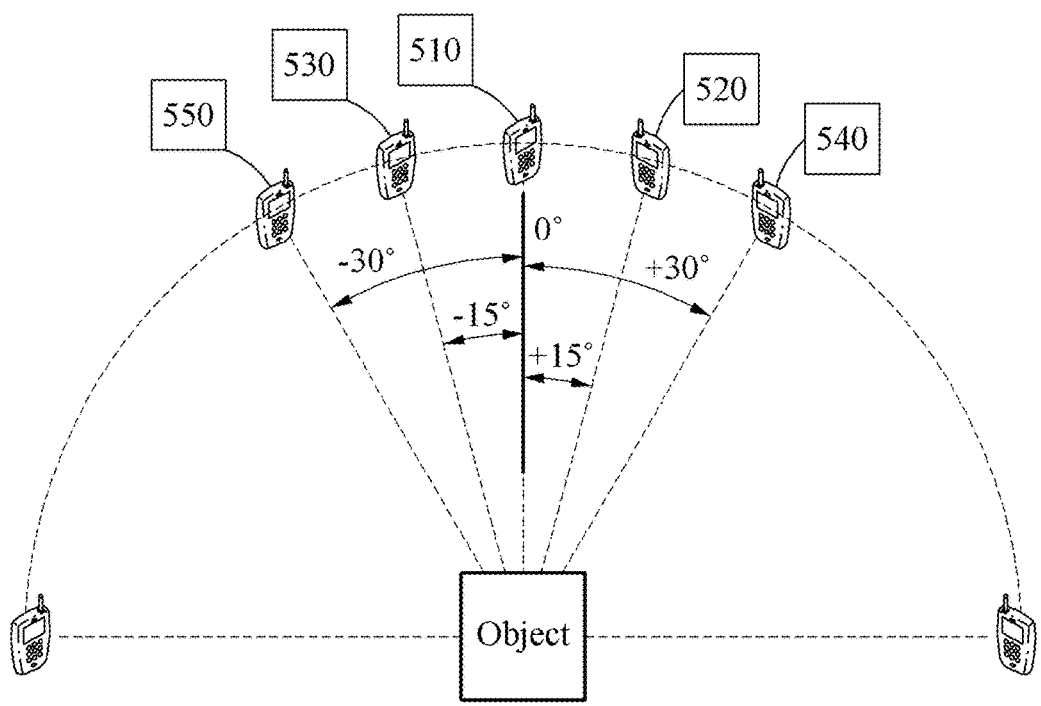
FIG. 5 illustrates an example of a method of determining a front image and a side image.

Descriptions related to a method of acquiring the plurality of images will be provided further with reference to FIGS. 4 and 5.

In operation 320, the processor 220 calculates pose information of the plurality of images.

According to one example, the pose information refers to a correlation between the plurality of images. For example, the processor 220 calculates the pose information based on pose data for each of the plurality of images.

Descriptions related to a method of calculating the pose information will be described further with reference to FIGS. 6 through 13.

In operation 330, the processor 220 generates a 3D image of the object based on the pose information.

Descriptions related to a method of generating the 3D image of the object will be described further with reference to FIGS. 14 through 17.

FIG. 4 illustrates an example of a method of acquiring a plurality of images of an object.

In this example, the operation 310 of acquiring the plurality of image includes operations 410 through 450.

In operation 410, the processor 220 extracts images from a plurality of initial images acquired by photographing an object. The plurality of initial images may be acquired by the camera 210.

In an example, a user photographs a face of a person using the camera 210. The camera 210 generates 3D head portrait images.

As an example, to photograph an image, the user may move the portable terminal from one side to another side, for example, from a left ear to a right ear, based on a head as an axis while holding the portable terminal in a hand. The photographed image may include a plurality of initial images of the head. For example, to obtain the plurality of initial 2D images of a user, the user may use a front camera of a portable terminal to take a plurality of pictures of himself or herself from a plurality of angles.

A method of acquiring initial images is not limited to the foregoing example.

In an example, each of the initial images may include a timestamp. The timestamp indicates a time at which each of the initial images is photographed or generated.

In another example, each of the initial image may include pose data and a timestamp corresponding to the pose data. The pose data may be data on a pose of the portable terminal in a state in which each of the initial images are photographed or generated. The pose data may be measured using, for example, an inertial sensor and an IMU included in the portable terminal. That is, the movement of the portable terminal may be measured by a sensor within the terminal to obtain the pose data.

The pose data indicates a direction of the portable terminal photographing an initial image or a pose of the portable terminal. For example, the pose data may indicate a rotation angle of the portable terminal photographing the initial image. The processor 220 acquires the pose data from the portable terminal and match the pose data for each initial image based on a rotation matrix.

Since a method of acquiring the pose data using the inertial sensor is technology known by those skilled in the art, repeated descriptions will be omitted for increased clarity and conciseness.

The processor 220 acquires the pose data and perform a preprocessing on the pose data. A timestamp of the initial image may differ from a timestamp of the pose data corresponding to the initial image. For example, the timestamp of the initial image may be earlier than the timestamp of the pose data. In contrast, the timestamp of the pose data may be earlier than the timestamp of the initial image.

The processor 220 performs the preprocessing by delaying the timestamp of the initial image for a predetermined time to correlate the timestamps. The predetermined time may be, for example, 200 milliseconds (ms).

In an example, the processor 220 extracts images from the plurality of initial images of the object based on a preset image extraction method. The preset image extraction method includes at least one of, for example, a method of extracting an image based on a quality of the image, a method of extracting an image based on pose data of the image, and a method of extracting an image based on a time at which the image is photographed.

In operation 420, the processor 220 sets the extracted images as candidate images.

In operation 430, the processor 220 determines a front image corresponding to a front side of the object among the candidate images. The front image may be determined to be a key image. Descriptions related to the front image will be described further with reference to FIG. 5.

In operation 440, the processor 220 determines an image having a preset rotation angle relative to the front image to be a side image among the candidate images. The side image may be determined to be a key image. Descriptions related to the side image will be described further with reference to FIG. 5.

In operation 450, the processor 220 acquires a plurality of images used to generate a 3D image based on the front image and the side image.

In an example, the processor 220 determines images having a relatively high quality to be the plurality of images based on qualities of the candidate images. Candidate images having, for example, low motion artifact and higher definition may be determined to be the plurality of images.

In another example, the processor 220 determines the plurality of images based on the pose data. Based on the pose data for each of the candidate images, the processor 220 determines candidate images having, for example, a rotation angle within a preset range to be the plurality of images.

In another example, the processor 220 determines the plurality of images based on a time.

When a generation time of the candidate images is between 0 and 5 seconds, candidate images corresponding to a generation time between 2 and 4 seconds may be determined to be the plurality of images. Candidate images generated in a middle period of time may have a higher quality when compared to candidate image generated in an initial period of time.

In another example, the processor 220 determines a starting position and an ending position of the plurality of images based on at least one of a vertical direction displacement and angular information acquired through an IMU.

When a variation of an acquired pitch angle is smaller than a preset angle, the processor 220 may determine a current moment as the starting point of the plurality of images. When the variation of the acquired pitch angle is larger than the preset angle, the processor 220 may determine the current moment as the ending position of the plurality of images. The preset angle may be, but not limited to, 5° or 7°.

In further another example, the processor 220 determines the current moment as the starting position of the plurality of images when a variation of an acquired vertical direction displacement is smaller than a preset width. The processor 220 may determine the current moment as the ending position of the plurality of images when the variation of the acquired vertical direction displacement is larger than the preset width. The preset width may be, but not limited to, 1 centimeter (cm) or 2 cm.

In terms of the method of determining the plurality of images among the candidate images, the processor 220 selects an image including a predetermined region of the image. The predetermined region may be, for example, the object. The processor 220 removes an image not including the object from the candidate images.

The processor 220 removes areas in each of the plurality of images other than an area corresponding to the object. As an example, the processor 220 may remove background areas from the plurality of images such that each of the plurality of images includes a face area only. When the plurality of images including only the area corresponding to the object is used in a 3D image generation, a time for subsequent processing may be reduced.

FIG. 5 illustrates an example of a method of determining a front image and a side image.

The processor 220 determines a front image 510 corresponding to a front side of an object among candidate images.

In this example, the processor 220 detects feature point information of a predetermined image among the candidate images. To determine the front image, the processor 220 calculates a symmetry of a feature point. For example, the processor 220 may determine an image that is calculated to have the most symmetric feature point to be the front image 510. The feature point may be, for example, a position of an eye to be detected, a location of the nose with respect to the eyes, and the like.

The processor 220 determines side images 520, 530, 540, and 550 corresponding to sides of the object among the candidate images.

In an example, the processor 220 determines a candidate image having a preset rotation angle relative to the front image 510 to be the side image 520, 530, 540, or 550 based on pose data of the candidate images. The preset rotation angle may be, for example, −15°, 15°, −30°, and 30°. The side image may be an image with the least feature points.

In another example, the processor 220 determines a best image pair based on an automatic algorithm.

Figure 6:
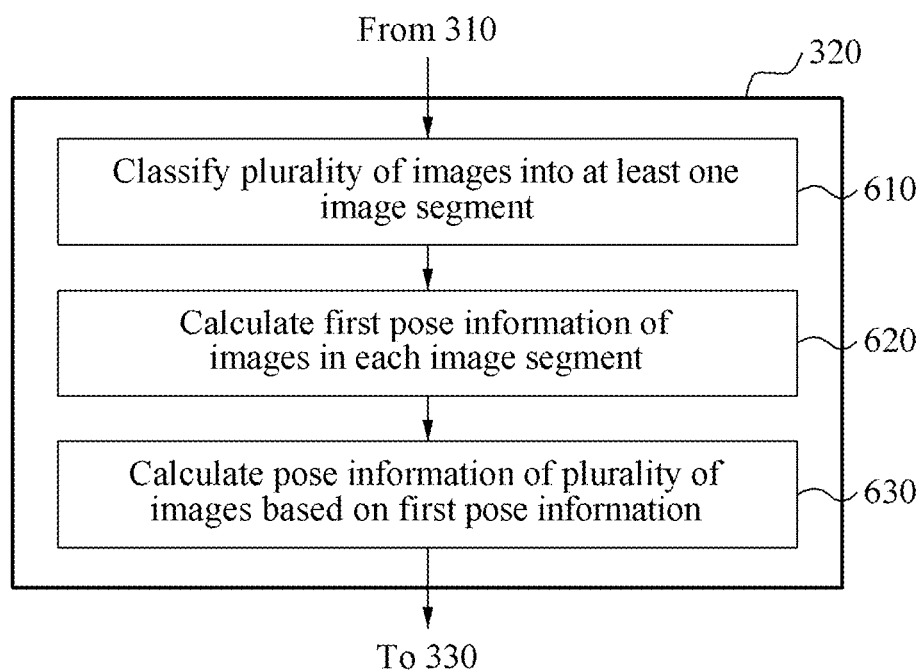
FIG. 6 is a flowchart illustrating an example of a method of calculating pose information of a plurality of images.

FIG. 6 illustrates an example of a method of calculating pose information of a plurality of images.

Referring to FIG. 6, the operation 320 of calculating pose information involves operations 610 through 630.

In operation 610, the processor 220 classifies a plurality of images into at least one image segment. An image segment includes at least one image. Descriptions related to an image segment classification method will be described further with reference to FIG. 7.

In operation 620, the processor 220 calculates first pose information of neighboring images in each image segment.

Descriptions related to the neighboring images will be described further with reference to FIG. 7.

Descriptions related to a method of calculating the first pose information will be described further with reference to FIG. 8.

In operation 630, the processor 220 calculates pose information of the plurality of images based on the first pose information.

Figure 7:
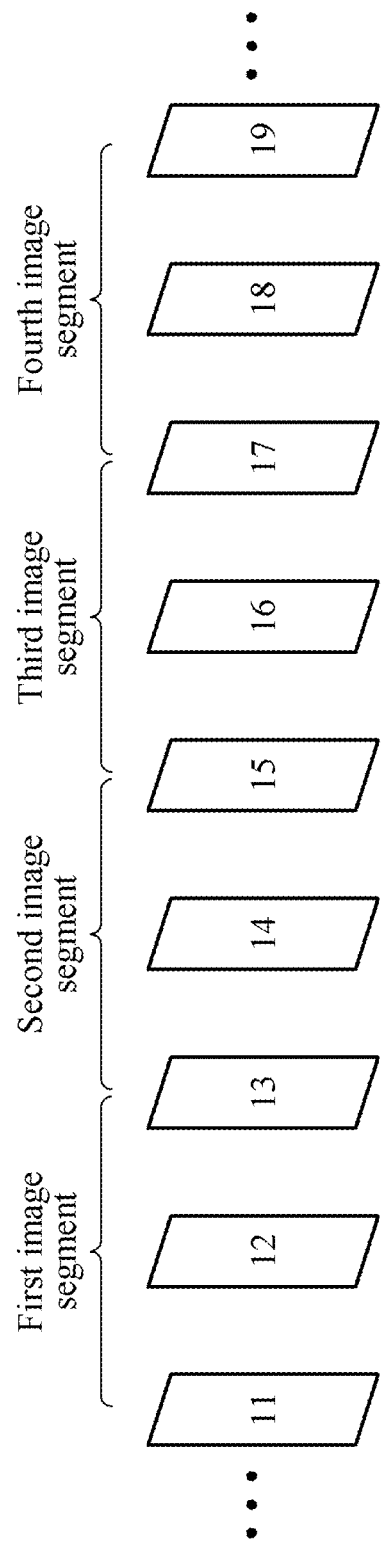
FIG. 7 illustrates an example of image segments.

FIG. 7 illustrates examples of image segments.

Referring to FIG. 7, the images segments include a plurality of images 11 through 19.

In this example, the processor 220 classifies the image segments such that each of the image segments includes three images. However, the number of images included in each image segment is not limited thereto. For instance, in n another example, the number of images may be greater than three or may be variable.

In this example, the processor 220 classifies the image segments such that neighboring image segments share an image. A first image segment includes the images 11 through 13. A second image segment includes the images 13 through 15. The image 13 may be a common image shared by the first image segment and the second image segment.

As an example, the neighboring images of each image segment described in an example of FIG. 6 may be the images 11 and 12. As another example, neighboring images in each of the image segments may be the images 15 and 16.

Also, the processor 220 classifies the image segments such that a key image is shared between two neighboring image segments.

Figure 8:
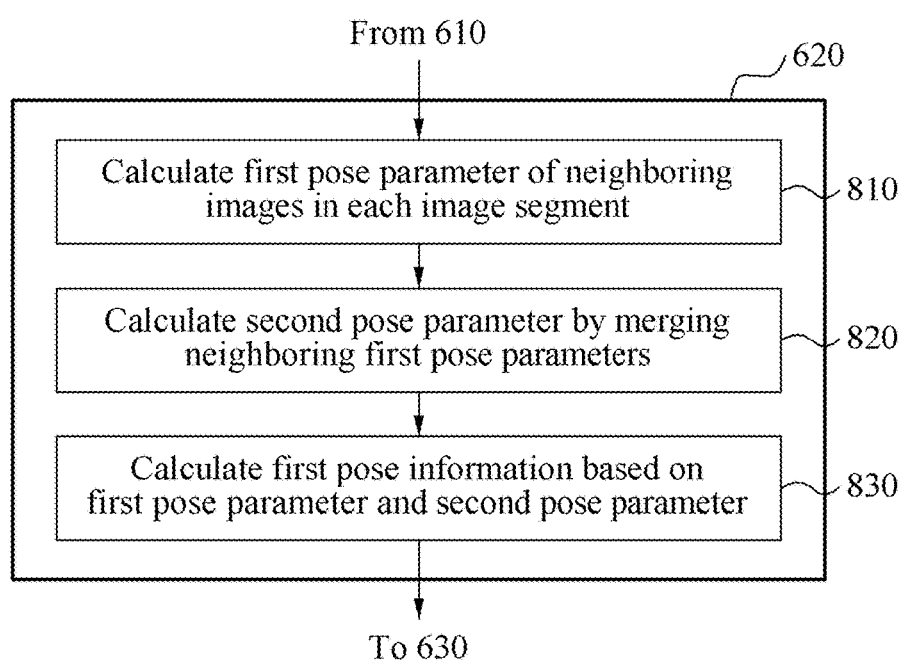
FIG. 8 is a flowchart illustrating an example of a method of calculating first pose information of images.

FIG. 8 illustrates an example of a method of calculating first pose information of images.

The operation 620 of calculating first pose information of images involves operations 810 through 830.

In operation 810, the processor 220 calculates a first pose parameter including at least one of parallel transference information, parallel transference direction information, and rotation angle information of neighboring images in each image segment. For example, the processor 220 calculates the first pose parameter of the neighboring images based on pose data of each of the neighboring images. Descriptions related to a method of calculating the first pose parameter will be described further with reference to FIG. 9.

In operation 820, the processor 220 calculates a second pose parameter by merging neighboring first pose parameters. The neighboring first pose parameters may correspond to a single common image. The second pose parameter includes parallel transference scale information, for example, parallel transference scale factor.

In operation 830, the processor 220 calculates first pose information based on the first pose parameter and the second pose parameter. The first pose information may be pose information of all images included in an image segment. The first pose information includes at least one of, for example, the rotation angle information, the parallel transference information, and the parallel transference scale information.

Figure 9:
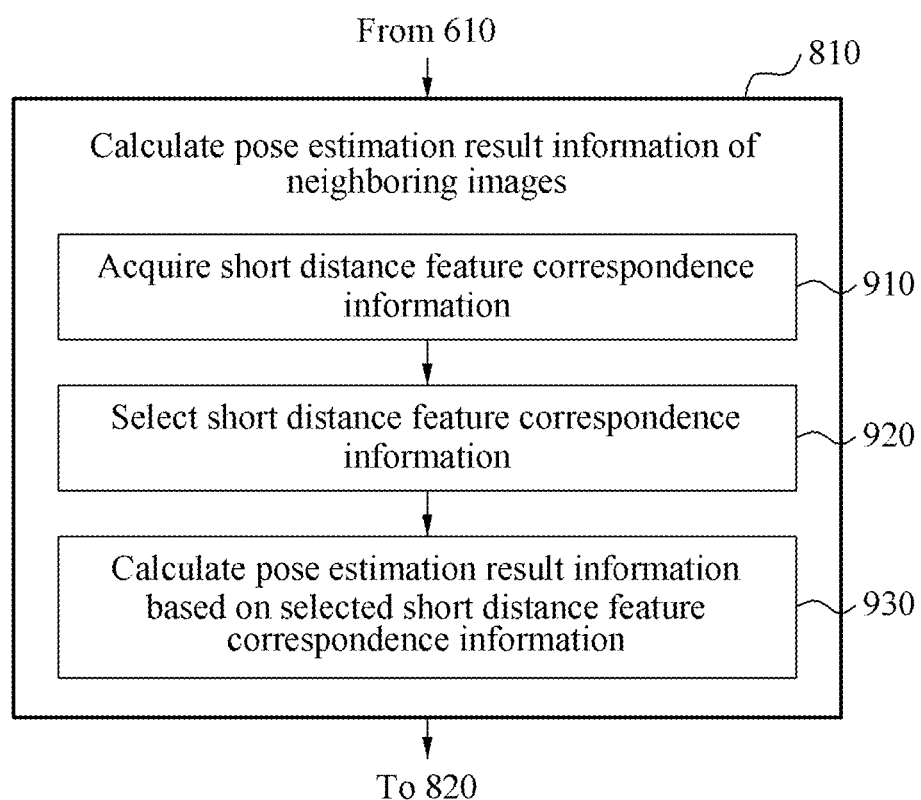
FIG. 9 is a flowchart illustrating an example of a method of a first pose parameter of images.

FIG. 9 illustrates an example of a first pose parameter of images.

The operation 810 of calculating first pose parameter of neighboring images includes an operation of calculating pose estimation result information based on short distance feature correspondence.

Operation 810 of calculating first pose parameter of neighboring images includes operations 910 through 930.

In operation 910, the processor 220 acquires short distance feature correspondence information from each image segment. The short distance feature correspondence information is, for example, information on a correspondence feature between a first image and second images neighboring the first image.

In an example, the processor 220 acquires the short distance feature correspondence information by extracting at least one feature point matching between the first image and the second images based on, for example, an active contour model (ACM), an active shape model (ASM), an active appearance model (AAM), and a supervised descent method (SDM). The short distance feature correspondence information includes a plurality of items of feature correspondence information.

Descriptions related to the short distance feature correspondence information will be described further with reference to FIG. 11.

The processor 220 detects a feature point of neighboring images in an image segment. The processor 220 tracks a feature point of neighboring images based on the detected feature point. The short distance feature correspondence information may be obtained by, for example, matching or tracking correspondence features of neighboring images.

The processor 220 detects the feature point by using, for example, an open source computer vision library (OpenCV). Alternatively, the processor 220 detects the feature point based on features from accelerated segment test (FAST).

In operation 920, the processor 220 selects the short distance feature correspondence information.

In an example, the processor 220 selects the short distance feature correspondence information based on a pose estimation algorithm. The pose estimation algorithm may be, for example, a random sample consensus (RANSAC).

Based on rotation angle information of neighboring images acquired through the pose estimation and an IMU, the processor 220 estimates parallel transference direction information of the neighboring images.

The processor 220 selects the short distance feature correspondence information based on the pose estimation algorithm and the estimated parallel transference direction information. The selected short distance feature correspondence information may be, for example, feature correspondence information having a relatively high accuracy on the neighboring images.

By selecting the short distance feature correspondence information, reliable short distance feature correspondence information may be acquired.

In operation 930, the processor 220 calculates pose estimation result information of the neighboring images based on the pose estimation algorithm and the selected short distance feature correspondence information. For example, the pose estimation result information includes a first pose parameter including at least one of rotation angle information and the parallel transference direction information.

Figure 10:
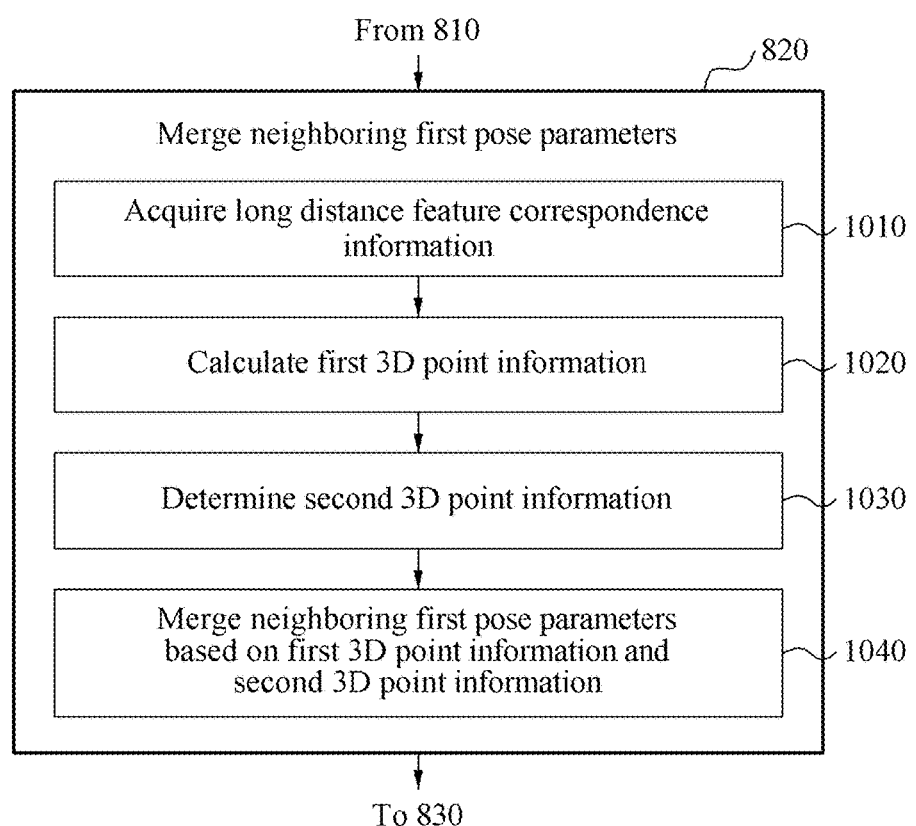
FIG. 10 is a flowchart illustrating an example of a method of calculating a second pose parameter.

FIG. 10 is a flowchart illustrating an example of a method of calculating a second pose parameter.

The operation 820 of calculating a second pose parameter involves an operation of merging neighboring first pose parameters based on long distance feature correspondence information and pose estimation result information.

Operation 820 includes operations 1010 through 1040.

In operation 1010, the processor 220 acquires long distance feature correspondence information. The long distance feature correspondence information is, for example, information on a correspondence feature between a first image and a third image that is not located adjacent to the first image in one image segment.

In an example, the long distance feature correspondence information may be obtained by extending a feature point acquired from the first image and a second image neighboring the first image to match the third image. The feature point acquired from the first image and the second image may be included in short distance feature correspondence information.

Since the long distance feature correspondence information is acquired in each image segment only, an accuracy of feature correspondence information may increase.

In operation 1020, the processor 220 calculates first 3D point information of two neighboring first pose parameters in the image segment based on a triangularization algorithm and the long distance feature correspondence information.

The first 3D point information may be expressed by a vertex having a spatial position.

In operation 1030, the processor 220 determines 3D point information acquired based on the pose estimation result information to be second 3D point information.

The second 3D point information may be expressed by a vertex having a spatial position.

In operation 1040, the processor 220 merges two neighboring first pose parameters based on the first 3D point information and the second 3D point information, thereby generating a second pose parameter.

The merging of the two neighboring first pose parameters in an image segment may be performed to acquire parallel transference scale information of the image segment. The processor 220 may generate the second pose parameter by multiplying one of parallel transference vectors of the two neighboring first pose parameters by a scale factor.

As an example, a first 3D point of the two neighboring first pose parameters may be assumed as A, a second 3D point may be assumed as B, and a light center point of a common image of the two neighboring first pose parameters may be assumed as O. In this example, the scale factor may be obtained by dividing a distance of AO by a distance of BO.

Additionally, when a plurality of neighboring first pose parameters is present in the image segment, a plurality of scale factors may be calculated. When the plurality of scale factors is calculated, the processor 220 may obtain a representative scale factor among the plurality of scale factors.

For example, the processor 220 may remove a scale factor calculated for A, B, and O which are not located on a common straight line. The processor 220 may calculate an intermediate value of remaining scale factors and determine the calculated intermediate value to be the representative scale factor.

Figure 11:
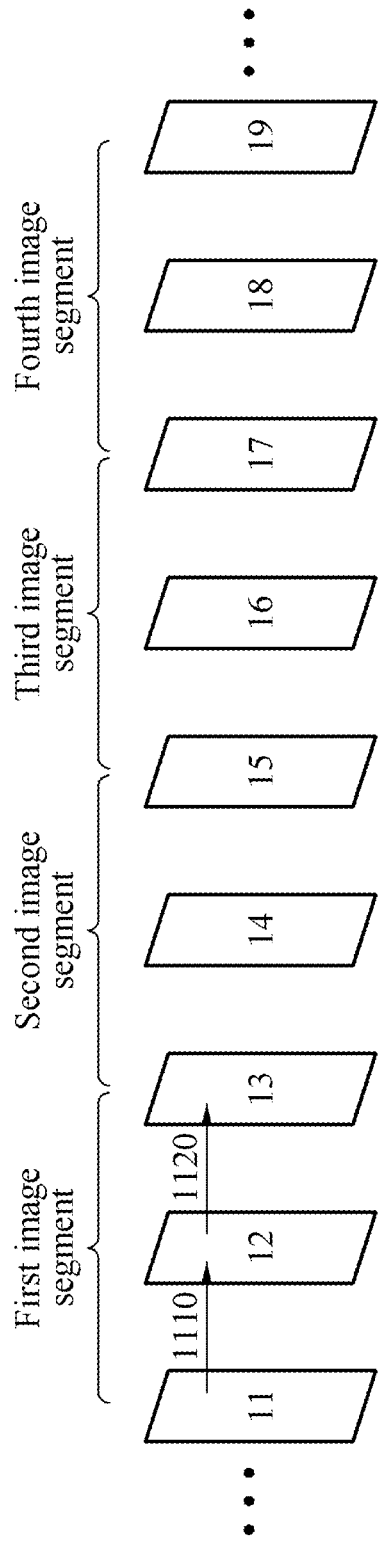
FIG. 11 illustrates an example of short distance feature correspondence information and long distance feature correspondence information.

FIG. 11 illustrates an example of short distance feature correspondence information and long distance feature correspondence information.

Referring to FIG. 11, the image segments illustrated in FIG. 7 includes a plurality of images.

In this example, the image 11 and image 12 of the first image segment are neighboring images used to acquire short distance feature correspondence information. The image 11 is also referred to as a feature correspondence initial image 11.

Short distance feature correspondence information 1110 may be feature correspondence information of the feature correspondence initial image 11 and the image 12 neighboring the feature correspondence initial image 11 in an image segment, for example, the first image segment, including the feature correspondence initial image 11.

Long distance feature correspondence information 1120 may be feature correspondence information of the images 12 and 13 in the first image segment aside from the feature correspondence initial image 11.

In an example, when the image 12 is the feature correspondence initial image, the first image segment including three images, the images 11 through 13, may not include the long distance feature correspondence information of the image 12 corresponding to the feature correspondence initial image.

Figure 12:
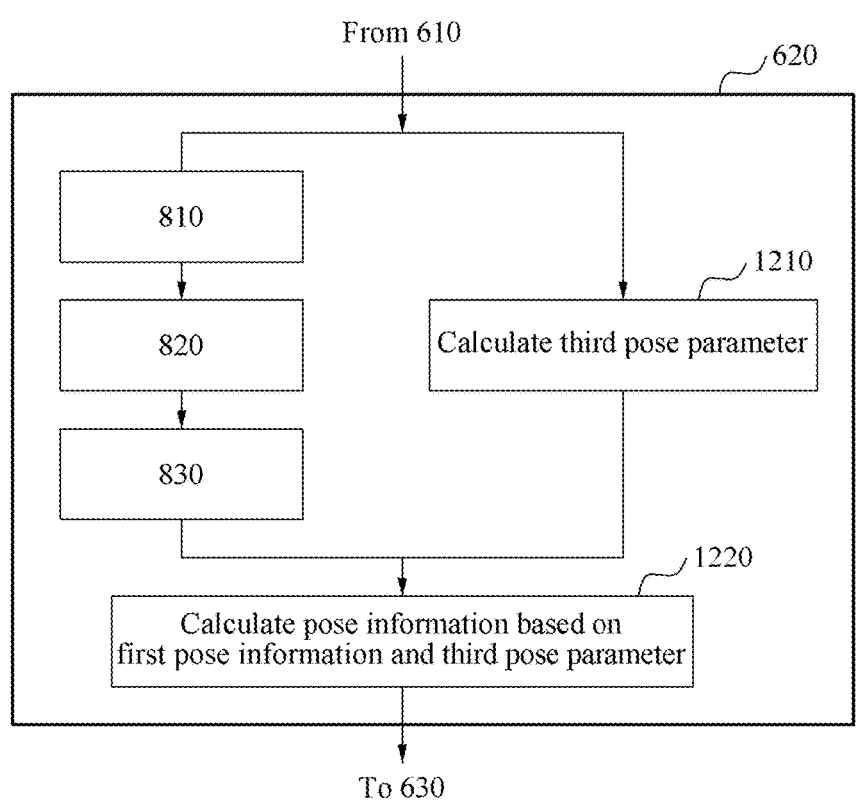
FIG. 12 is a flowchart illustrating another example of a method of calculating first pose information of images.

FIG. 12 illustrates another example of a method of calculating first pose information of images.

The operation 620 of calculating first pose information of images involves operations 1210 and 1220.

In operation 1210, the processor 220 calculates a third pose parameter of a plurality of images by merging neighboring first pose parameters included in differing image segments. The third pose parameter includes, for example, parallel transference scale information.

The neighboring first pose parameters included in the differing image segments correspond to a common image shared by the differing image segments.

Descriptions related to a method of calculating the third pose parameter will be described further with reference to FIG. 13.

In operation 1220, the processor 220 calculates pose information of the plurality of images based on first pose information and the third pose parameter.

The first pose information is calculated based on a first pose parameter and a second pose parameter in operation 830 as described above.

In an example, the pose information includes parallel transference scale information, parallel transference direction information, and rotation angle information neighboring key images in each image segment. The pose information may also include parallel transference scale information of the plurality of images.

The processor 220 calculates the pose information of the plurality of images based on one of, for example, a 5-point algorithm, a 6-point algorithm, and an 8-point algorithm.

Figure 13:
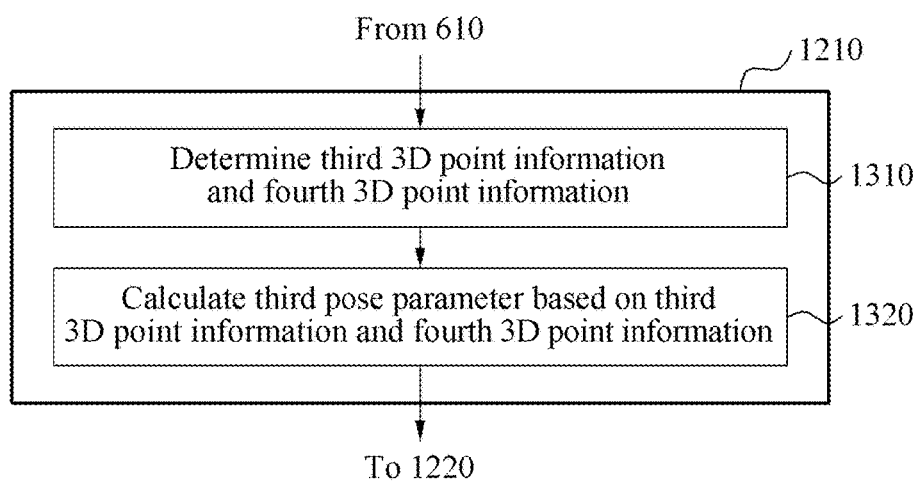
FIG. 13 is a flowchart illustrating an example of a method of calculating a third pose parameter.

FIG. 13 illustrates an example of a method of calculating a third pose parameter.

Referring to FIG. 13, the operation 1210 of calculating third pose parameter involves operations 1310 and 1320.

In operation 1310, among second 3D point information, the processor 220 determines third 3D point information and fourth 3D point information corresponding to neighboring first pose parameters, respectively. In this example, each of the neighboring first pose parameters is included in a different image segment.

The neighboring first pose parameters included in the first image segment and the second image segment may be applicable as described with reference to FIG. 11. The first pose parameter included in the first image segment corresponds to the third 3D point information. The first pose parameter included in the second image segment corresponds to the fourth 3D point information.

The second 3D point information includes 3D point information of each image segment acquired through a calculation of a pose estimation algorithm. The processor 220 determines 3D point information of the first image segment acquired from the second 3D point information to be the third 3D point information. The processor 220 determines 3D point information of the second image segment acquired from the second 3D point information to be the fourth 3D point information.

In operation 1320, the processor 220 calculates a third pose parameter of the plurality of images by merging the neighboring first pose parameters included in the differing image segments based on the third 3D point information and the fourth 3D point information.

Since the foregoing descriptions related to the method of calculating the second pose parameter is also applicable to a method of calculating the third pose parameter, repeated descriptions will be omitted for increased clarity and conciseness.

Figure 14:
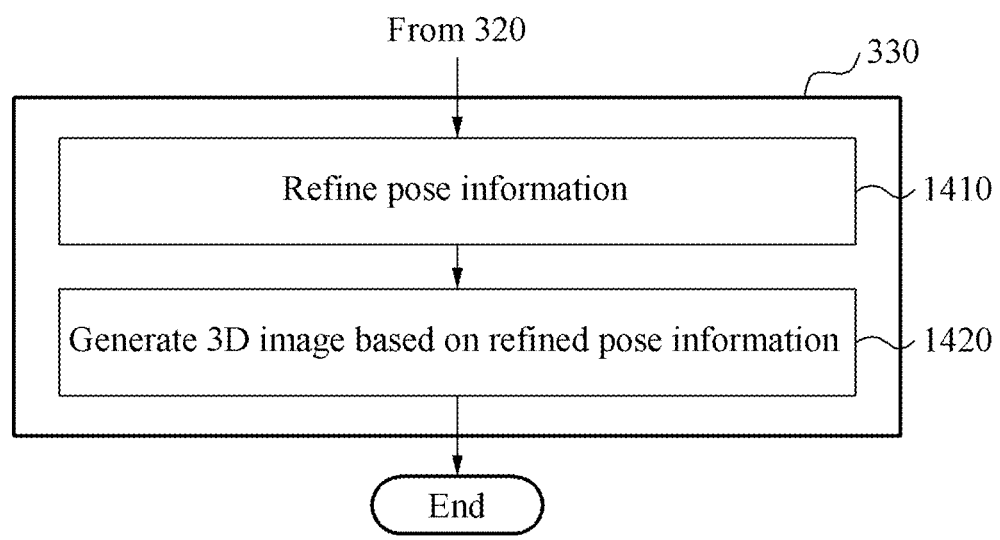
FIG. 14 is a flowchart illustrating an example of a method of generating a 3D image of an object.

FIG. 14 illustrates an example of a method of generating a 3D image of an object.

The operation 330 of generating a 3D image of the object involves operations 1410 and 1420.

In operation 1410, the processor 220 refines pose information. For example, the processor 220 refines the pose information by performing a bundle adjustment processing on the pose information.

In operation 1420, the processor 220 generates a 3D image based on the refined pose information. Descriptions related to a method of generating the 3D image will be described further with reference to FIGS. 15 through 17.

Figure 15:
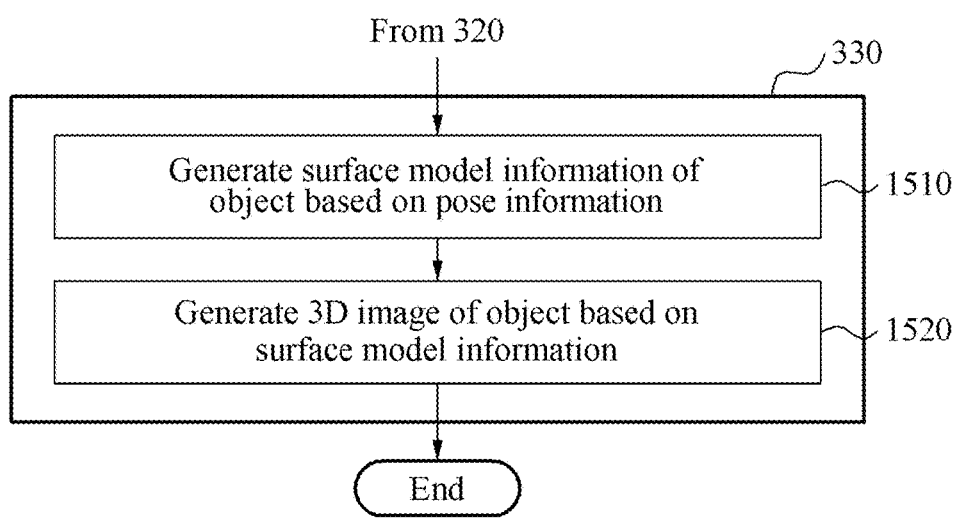
FIG. 15 is a flowchart illustrating another example of a method of generating a 3D image of an object.

FIG. 15 illustrates another example of a method of generating a 3D image of an object.

Referring to FIG. 15, the operation 330 of generating an 3D image involves operations 1510 and 1520.

In operation 1510, the processor 220 generates surface model information of an object based on pose information. Descriptions related to a method of generating the surface model information will be described further with reference to FIGS. 16 and 17.

In operation 1520, the processor 220 generates a 3D image of the object based on the surface model information.

Figure 16:
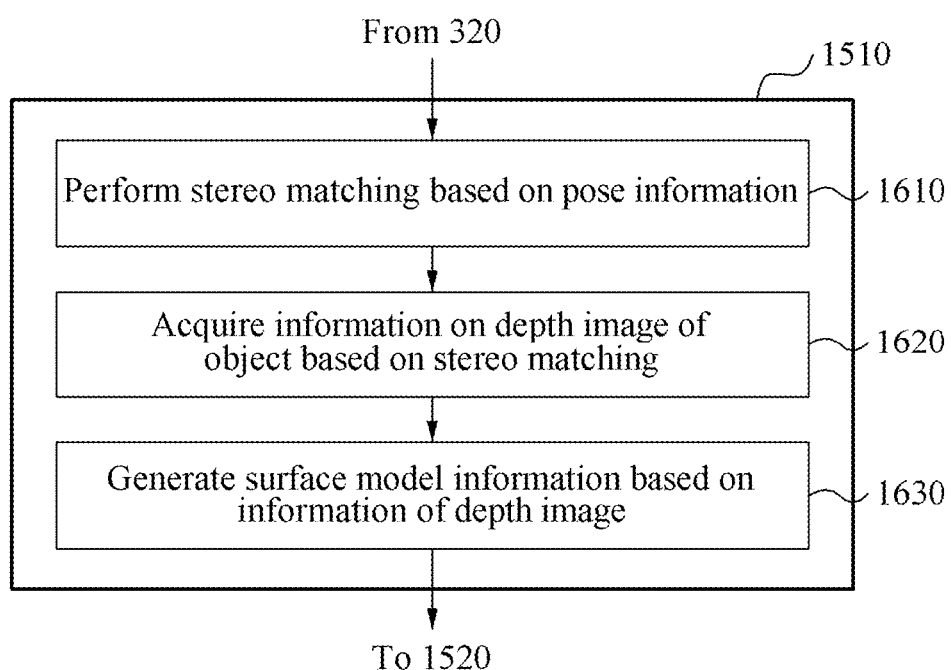
FIG. 16 is a flowchart illustrating an example of a method of generating surface model information.

FIG. 16 illustrates an example of a method of generating surface model information.

The operation 1510 of generating surface model information involves operations 1610 through 1630.

In operation 1610, the processor 220 performs a stereo matching based on pose information. The stereo matching indicates, for example, an operation of matching features of a plurality of images.

Since the stereo matching is technology known by those skilled in the art, repeated descriptions are omitted for increased clarity and conciseness.

In operation 1620, the processor 220 acquires information on a depth image of the object based on the stereo matching.

In operation 1630, the processor 220 generates surface model information of the object based on the information of the depth image.

Figure 17:
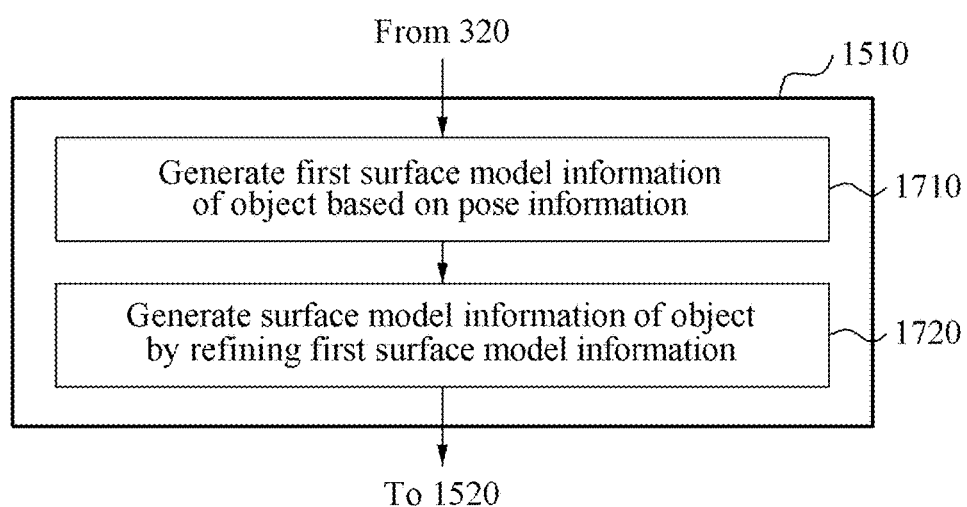
FIG. 17 is a flowchart illustrating another example of a method of generating surface model information.

FIG. 17 illustrates another example of a method of generating surface model information.

Referring to FIG. 17, the operation 1510 of generating surface model information involves operations 1710 and 1720.

In operation 1710, the processor 220 generates first surface model information of an object based on pose information.

The processor 220 generates the first surface model information based on a depth image. For example, surface model information generated in operation 1630 may be the first surface model information.

In operation 1720, the processor 220 generates surface model information of the object by refining the first surface model information.

The processor 220 refines the first surface model information based on template model information of the object. The processor 220 aligns a template model in a front image. The processor 220 aligns the template model based on a feature point of the template model and a feature point of the front image.

As an example, the processor 220 removes information not corresponding to the template model information from the first surface model information based on the template model information.

As another example, when a difference between a first value of the first surface model information and a second value of the template model information corresponding to the first value is greater than a preset threshold, the processor 220 removes the first value.

As another example, the processor 220 adds information to the first surface model information based on the template model information.

Alternatively, the processor 220 acquires first cylindrical projection information by performing a cylindrical projection on the aligned template model information. The processor 220 acquires texture coordinate information corresponding to the first cylindrical projection information.

The processor 220 generates second cylindrical projection information by refining the first cylindrical projection information. The second cylindrical projection information may be the surface model information of the object.

As an example, the processor 220 removes information not corresponding to the first cylindrical projection information from the second cylindrical projection information.

As another example, the processor 220 removes information of which a difference from the first cylindrical projection information is greater than a preset threshold, from the second cylindrical projection information.

As another example, the processor 220 inserts additional information in the second cylindrical projection information based on a gradient value of the first cylindrical projection information.

The processor 220 performs a smoothness processing on the second cylindrical projection information.

After operation 1720 is performed, the processor 220 generates a 3D image based on the surface model information in operation 1520.

In an example, the processor 220 generates texture information of the surface model information.

The processor 220 acquires two differing side images of the object and maps the two differing side images on a plane having texture coordinates, thereby acquiring two texture maps. The texture coordinates may be acquired by performing the cylindrical projection on the first surface model information.

The processor 220 performs an adjustment on illuminations and colors of the two texture maps. The processor 220 joints the two adjusted texture maps to acquire one texture map.

The processor 220 generates a 3D image based on the acquired texture map.

Figure 18:
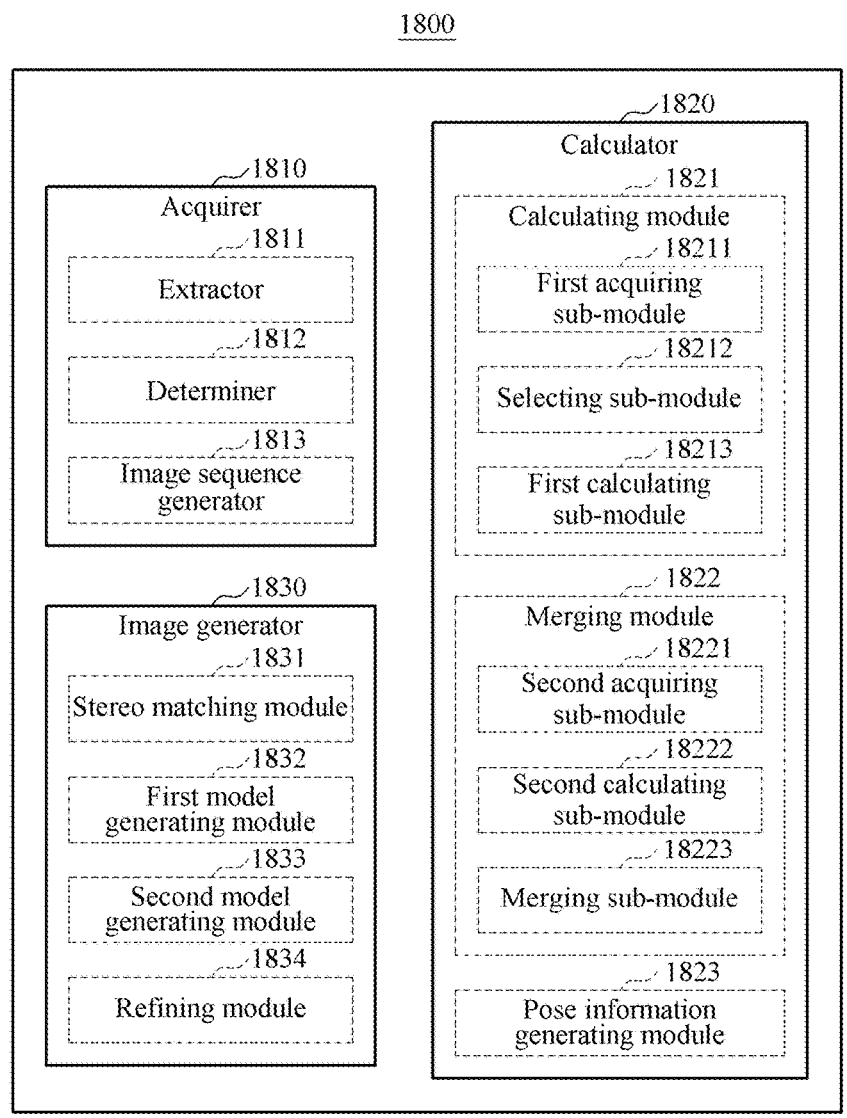
FIG. 18 is a block diagram illustrating another example of a 3D image generation apparatus.

FIG. 18 is a block diagram illustrating a 3D image generation apparatus 1800.

The 3D image generation apparatus 1800 corresponds to the apparatus 200.

The 3D image generation apparatus 1800 includes an acquirer 1810, a calculator 1820, and an image generator 1830. The acquirer 1810, the calculator 1820, and the image generator 1830 may include one or more processor and memory.

The acquirer 1810 acquires a plurality of images of an object. For example, the plurality of images may be obtained from a camera, retrieved from a buffer memory or obtained from a data storage.

The calculator 1820 calculates pose information of the plurality of images. The pose information may be stored in a memory.

The image generator 1803 generates a 3D image based on the pose information.

In an example, the acquirer 1810 may include an extractor 1811 configured to extract a portion of initial images of the object to be candidate images based on a preset extraction method, a determiner 1812 configured to determine a front image and a side image among the candidate images, and an image sequence generator 1813 configured to acquire a plurality of images based on the determined front image and side image.

The calculator 1820 may include a calculating module 1821 configured to calculate first pose parameters of neighboring images in each image segment, a merging module 1822 configured to generate a second pose parameter by merging first pose parameters of two neighboring images, and a pose information generating module 1823 configured to generate first pose information based on the first pose parameters and the second parameter.

The calculating module 1821 may include a first acquiring sub-module 18211 configured to acquire short distance feature correspondence information, a selecting sub-module 18212 configured to select the short distance feature correspondence information, and a first calculating sub-module 18213 configured to pose estimation result information of the neighboring images based on the selected short distance feature correspondence information.

The merging module 1822 may include a second acquiring sub-module 18221 configured to acquire long distance correspondence information, a second calculating sub-module 18222 configured to calculate first 3D point information of the first pose parameters of the two neighboring images based on the long distance feature correspondence information, and a merging sub-module 18223 configured to merge the first pose parameters based on the first 3D point information and second 3D point information.

The image generator 1830 may include a stereo matching module 1831 configured to generate depth image information by performing a stereo matching based on the pose information, a first model generating module 1832 configured to generate surface model information based on the depth image information, a second model generating module 1833 configured to generate first surface model information of the object, and a refining module 1834 configured to generate the surface model information of the object by refining the first surface model information. The generated surface model information may be stored in a memory.

Figure 19:
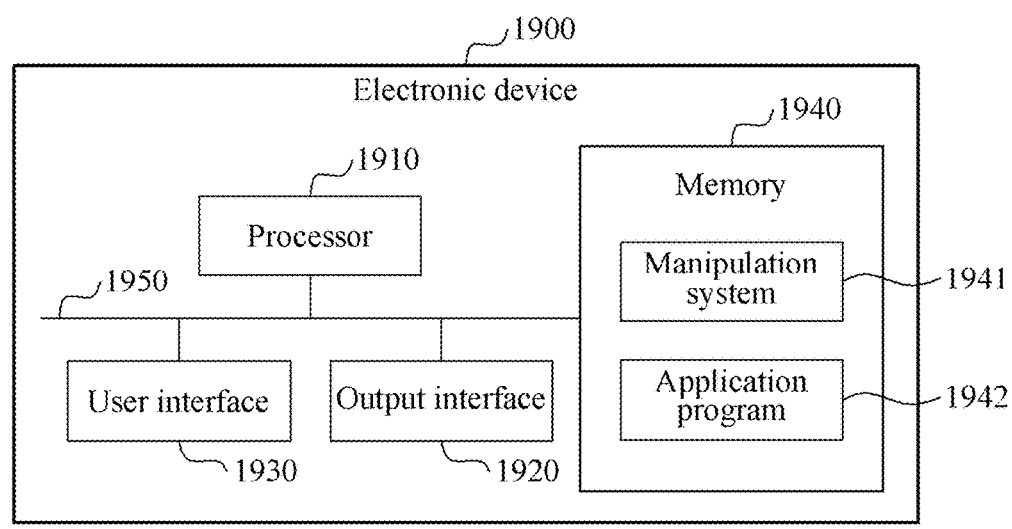
FIG. 19 is a block diagram illustrating yet another example of a 3D image generation apparatus.

FIG. 19 is a block diagram illustrating still another example of a 3D image generation apparatus.

An electronic device 1900 corresponds to the apparatus 200.

The electronic device 1900 includes a processor 1910, for example, a central processing unit (CPU), at least one of an output interface 1920 and a user interface 1930, a memory 1940, and at least one communication bus 1950.

For example, the processor 220 corresponds to the processor 1910, the camera 210 corresponds to the at least one user interface 1930, and the memory 1940 corresponds to the storage 230.

The apparatuses, units, modules, devices, and other components illustrated in FIGS. 2 and 12 that perform the operations described herein with respect to FIGS. 3, 4, 6, 8-10 and 13-17 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3, 4, 6, 8-10 and 13-17. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 4, 6, 8-10 and 13-17 that perform the operations described herein with respect to FIGS. 1, 7 and 11 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a terminal as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a three-dimensional (3D) image, the method comprising:
acquiring a plurality of images of a 3D object with a camera included in a portable terminal;
classifying the plurality of images into at least one image segment;
calculating a first pose parameter, comprising at least one of rotation angle information and parallel transference direction information between a first image and a neighboring second image of the at least one image segment, based on a feature correspondence between the first image and the second image, pose data of the first image, and pose data of the second image;
calculating another first pose parameter, comprising at least one of rotation angle information and parallel transference direction information between the second image and a neighboring third image of the at least one image segment, based on a feature correspondence between the second image and the third image, the pose data of the second image, and pose data of the third image;
calculating a second pose parameter, comprising parallel transference scale information, by merging the first pose parameters;
calculating pose information of the first through third images based on the first pose parameters and the second pose parameter, wherein the pose data for each of the first through third images are measured by an inertial measurement unit (IMU) included in the portable terminal; and
generating a 3D image corresponding to the 3D object based on the pose information.

2. The method of claim 1, wherein:
wherein the first image is a feature correspondence initial image and the second image is one of images neighboring the feature correspondence initial image,
the calculating of the first pose parameter comprises calculating pose estimation result information of the neighboring images, the pose estimation result information comprising the first pose parameter and short distance feature correspondence information, the short distance feature correspondence information comprising a feature correspondence initial image and feature correspondence information of the images neighboring the feature correspondence initial image in a first image segment comprising the feature correspondence initial image, and wherein the calculating of the second pose parameter comprises merging the neighboring first pose parameters based on long distance feature correspondence information and the pose estimation result information, the long distance feature correspondence information comprising feature correspondence information of images in the first image segment other than the feature correspondence initial image.

3. The method of claim 1, wherein the calculating of the pose information of the plurality of images further comprises: calculating a third pose parameter of the plurality of images by merging neighboring first pose parameters included in differing image segments, wherein the neighboring first parameters included in the differing image segments correspond to an image shared by the differing image segments, and the third pose parameter comprises parallel transference scale information; and calculating the pose information of the plurality of images based on the first pose information and the third pose parameter.

4. The method of claim 2, wherein the calculating of the pose information of the plurality of images further comprises:
calculating a third pose parameter of the plurality of images by merging neighboring first pose parameters included in differing image segments, wherein the neighboring first pose parameters included in the differing image segments correspond to an image shared by the differing image segments, and the third pose parameter comprises parallel transference scale information; and
calculating the pose information of the plurality of images based on the pose information and the third pose parameter, and
wherein the calculating of the third pose parameter comprises:
determining third 3D point information and fourth 3D point information, each corresponding to the neighboring first pose parameters included in the differing image segments among the second 3D point information indicating the 3D point information acquired through the pose estimation result information; and
calculating a third pose parameter of the plurality of images by merging the neighboring first pose parameters included in the differing image segments based on the third 3D point information and the fourth 3D point information.

5. The method of claim 1, wherein the generating comprises:
refining the pose information; and
generating the 3D image based on the refined pose information.

6. The method of claim 1, wherein the generating comprises:
generating surface model information of the 3D object based on the pose information; and
generating the 3D image based on the surface model information.

7. The method of claim 6, wherein the generating of the surface model information comprises:
performing a stereo matching based on the pose information;
acquiring depth image information of the 3D object based on a result of the stereo matching; and
generating the surface model information based on the depth image information.

8. The method of claim 6, wherein the generating of the surface model information comprises:
generating first surface model information of the 3D object based on the pose information; and
generating the surface model information by refining the first surface model information.

9. The method of claim 8, wherein the generating of the surface model information by refining the first surface model information comprises:
refining the first surface model information based on template model information of the 3D object.

10. The method of claim 9, wherein the refining of the first surface model information based on the template model information comprises at least one of:
removing information not corresponding to the template model information from the first surface model information;
removing a first value of the first surface model information in response to a difference between the first value and a second value of the template model information corresponding to the first value being greater than a preset threshold; and adding information to the first surface model information.

11. The method of claim 1, wherein the acquiring of the plurality of images comprises acquiring the plurality of images by extracting images from a plurality of initial images of the 3D object based on a preset image extraction method.

12. The method of claim 11, wherein the preset image extraction method comprises at least one of a method of extracting an image based on a quality of the image, a method of extracting an image based on pose data of the image, and a method of extracting an image based on a photographing time of the image.

13. The method of claim 11, wherein the acquiring of the plurality of images by extracting the images comprises:
setting the extracted images as candidate images;
determining a front image corresponding to a front side of the 3D object among the candidate images;
determining an image having a preset rotation angle relative to the front image to be a side image among the candidate images; and
acquiring the plurality of images based on the front image and the side image.

14. The method of claim 1, wherein the acquiring the plurality of images comprises classifying the plurality of images into at least one image segment, and neighboring image segments share at least one image.

15. The method of claim 1, wherein the 3D object comprises a face.

16. A terminal comprising:
a camera configured to acquire a plurality of images of a three-dimensional (3D) object; and
a processor configured to:
classify the plurality of images into at least one image segment;
calculate a first pose parameter, comprising at least one of rotation angle information and parallel transference direction information between a first image and a neighboring second image of the at least one image segment, based on a feature correspondence between the first image and a the second image, pose data of the first image, and pose data of the second image;
calculate another first pose parameter, comprising at least one of rotation angle information and parallel transference direction information between the second image and a neighboring third image of the at least one image segment, based on a feature correspondence between the second image and the third image calculate a second pose parameter, comprising parallel transference scale information, by merging the first pose parameters based on a feature correspondence between the first image and the third image,
calculate pose information of the first through third images based on the first pose parameters, the second pose parameter, and pose data for each of the first through third images measured by an inertial measurement unit (IMU), and
generate a 3D image corresponding to the 3D object based on the pose information.

17. A method of generating a three-dimensional (3D) image, the method comprising:
acquiring a plurality of images of a 3D object with an electronic device;
classifying the plurality of images into at least first and second image segments, wherein the first and second image segments are neighboring image segments and share a common image;
calculating an initial pose parameter of an image of the first image segment and the common image, comprising at least one of rotation angle information and parallel transference direction information between the image of the first image segment and the common image;
calculating another initial pose parameter of an image of the second image segment and the common image, comprising at least one of rotation angle information and parallel transference direction information between the image of the second image segment and the common image;
calculating pose information, comprising parallel transference scale information, for the first and second image segments by merging the initial pose parameters; and
generating a 3D image corresponding to the 3D object based on the pose information and information regarding a movement of the electronic device obtained via a sensor included in the electronic device.

18. The method of claim 17, wherein the electronic device is a terminal comprising a camera, and the sensor is an inertial measurement unit of the terminal.

19. A non-transitory computer-readable storage medium storing instructions that, when executed by a processor, cause the processor to perform the method of claim 1.

20. A non-transitory computer-readable storage medium storing instructions that, when executed by a processor, cause the processor to perform the method of claim 17.

* * * * *